United States Patent [19]

Junger

[11] 4,343,328
[45] Aug. 10, 1982

[54] FLOW SENSING CHECK VALVE

[75] Inventor: Eugene E. Junger, New Berlin, Wis.

[73] Assignee: Applied Power Inc., Milwaukee, Wis.

[21] Appl. No.: 191,639

[22] Filed: Sep. 26, 1980

[51] Int. Cl.³ .......................................... F15B 13/042
[52] U.S. Cl. ................................ 137/491; 137/492.5; 137/493
[58] Field of Search ............... 137/493, 491, 489, 492, 137/492.5, 460, 498

[56] References Cited

U.S. PATENT DOCUMENTS

| | | | |
|---|---|---|---|
| 2,366,596 | 1/1945 | Clifton | 137/491 |
| 2,989,072 | 6/1961 | Banker | 137/491 |
| 3,100,503 | 8/1963 | Tennis | 137/493 X |
| 3,107,688 | 10/1963 | Caslow | 137/489 X |
| 3,221,763 | 12/1965 | Widdowson | 137/491 X |
| 3,330,298 | 7/1967 | Allen | 137/493 X |
| 4,010,770 | 3/1977 | Peters | 137/460 X |

Primary Examiner—Alan Cohan
Attorney, Agent, or Firm—John J. Byrne

[57] ABSTRACT

Disclosed is a flow sensing check valve comprising an outer shell; an inner sleeve mounted in the outer shell and having a first port at one end, a second port at the other end, and a third port axially located intermediate the other two near the first port; a poppet valve urged into valving engagement with the first port, the poppet valve being in sealing engagement with the interior of the inner sleeve between the second and third ports and having a pilot flow control passageway therethrough; and a velocity fuse mounted in the second port. When the velocity fuse senses a pre-selected difference in flow, it causes the poppet valve to seat.

8 Claims, 4 Drawing Figures

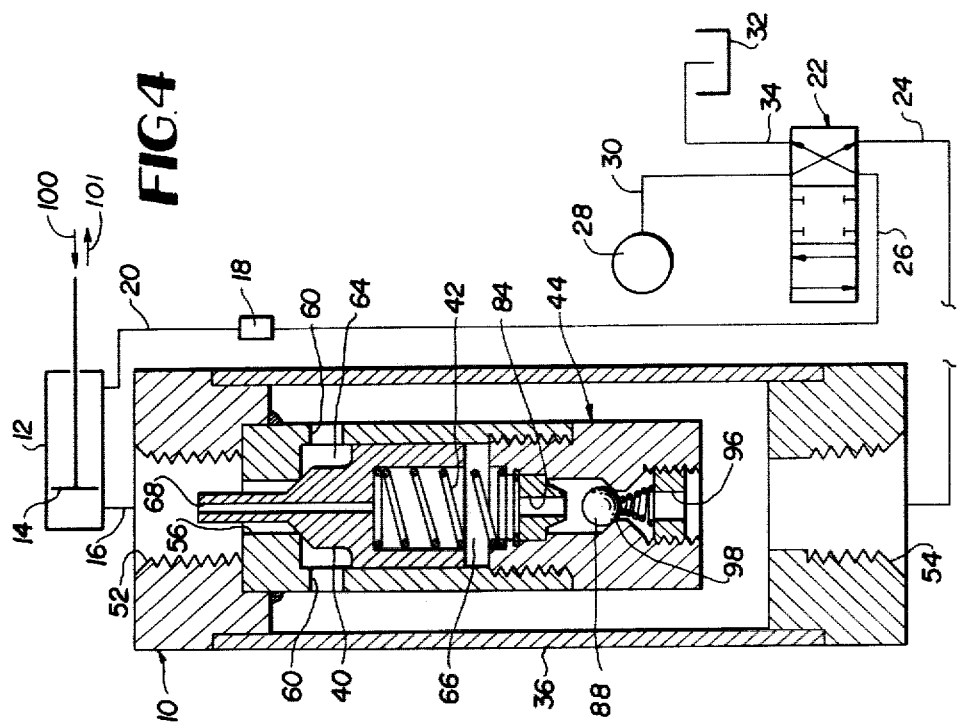
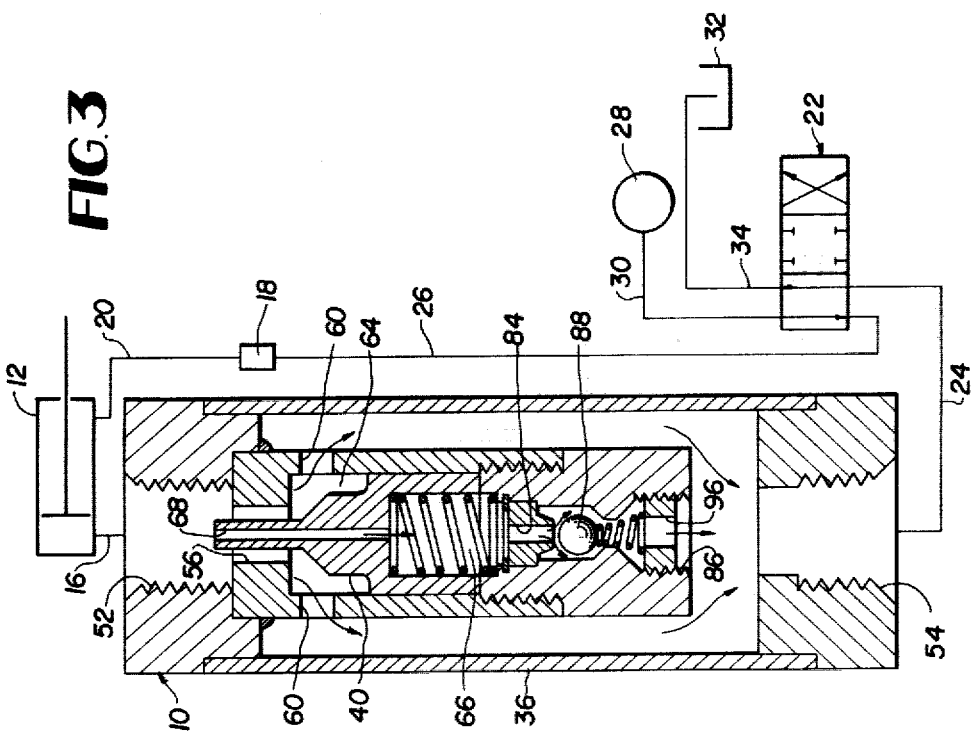

FLOW SENSING CHECK VALVE

TECHNICAL FIELD

This invention relates to fluid control circuits. In particular, it relates to safety devices which react to excess flows by closing the circuit, thereby preventing uncontrolled motion of the load and possible damage to the hydraulic system and/or to its environment.

BACKGROUND OF PRIOR ART

The prior art is composed of two-stage hydraulic relief valves. The circuits of these valves oftentimes comprise a direct acting relief valve first stage piloting a second stage reverse acting check valve. The invention described herein, however, is incorporated in a velocity fuse capable of sensing excess flows caused by uncontrolled motion of a hydraulic actuating device.

BRIEF SUMMARY OF THE INVENTION

The subject invention comprises an outer shell; an inner sleeve mounted in the outer shell and having a first port at one end, a second port at the other end, and a third port axially located intermediate the other two near the first port; a poppet valve urged into valving engagement with the first port, the poppet valve being in sealing engagement with the interior of the inner sleeve between the second and third ports and having a pilot flow control passageway therethrough; and a velocity fuse mounted in the second port. When the velocity fuse senses a pre-selected difference in flow, it causes the poppet valve to seat.

BRIEF SUMMARY OF THE DRAWINGS

FIG. 3 is a view similar to FIG. 1 except that it shows the subject check valve in the reverse flow condition.

FIG. 4 is a view similar to FIG. 1 except that it shows the subject check valve in the excess flow condition.

DETAILED DESCRIPTION OF THE PRESENTLY PREFERRED EMBODIMENT

Figure 2:
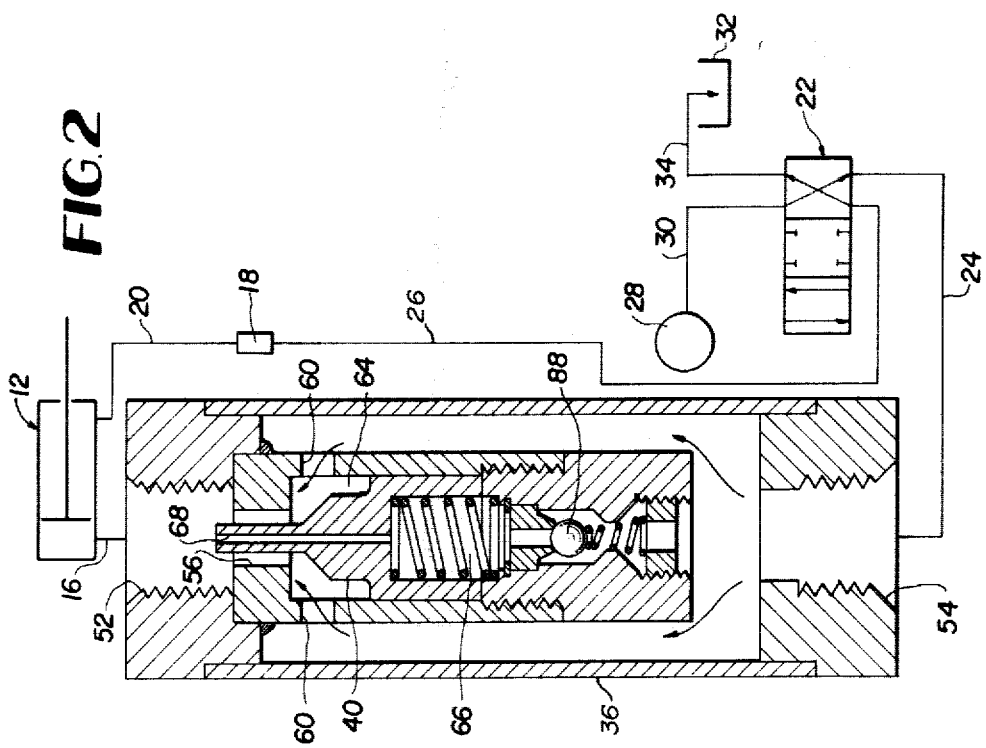
FIG. 2 is a view similar to FIG. 1 except that it shows the subject check valve in the flow forward condition.

Each figure shows the subject check valve 10 in a hydraulic circuit shown in highly schematic form. The hydraulic circuit comprises, in addition to the check valve 10, a hydraulic actuator 12 containing a piston 14, a hydraulic line 16 leading from the check valve 10 to the hydraulic actuator 12 on the push side of the piston 14, an optional second check valve 18 identical to the check valve 10, a hydraulic line 20 leading from the check valve 18 to the hydraulic actuator 12 on the pull side of the piston 14, a three-position control valve 22, a hydraulic line 24 leading from the check valve 10 to the control valve 22, a hydraulic line 26 leading from the check valve 18 to the control valve 22, a pump 28, a hydraulic line 30 leading from the pump 28 to the control valve 22, a tank 32, and a hydraulic line 34 leading from the tank 32 to the control valve 22. A linear type hydraulic actuator is shown in the drawings, but, as will be apparent, the subject check valve could be connected to a rotary hydraulic actuator or any other type of hydraulic actuator. Similarly, it should be noted that the schematically illustrated circuit is applicable to any kind of hydraulic equipment requiring excess flow protection, such as construction equipment, mining equipment, agricultural equipment, etc.

The check valve 10 comprises an outer shell 36, an inner sleeve 38, a poppet valve 40, biasing means 42, and a velocity fuse 44. The outer shell 36 comprises a cylindrical body 46 and two end plugs 48 and 50. The end plug 48 has a threaded port 52 therethrough for connection to the hydraulic line 16, and the end plug 50 has a threaded port 54 therethrough for connection to the hydraulic line 24.

The inner sleeve 38 is mounted in the outer shell 36 by means of a seal between the end plug 48 and the inner sleeve 38. The inner sleeve 38 has a port 56 at one end in fluid communication with the port 52 in the outer shell 36, a threaded port 58 at the other end in fluid communication with the port 54 in the outer shell 36, and a port or ports 60 radially disposed intermediate the other two ports in fluid communication with the port 54 in the outer shell 36.

The poppet valve 40 is slidably disposed in the inner sleeve 38. The outer periphery 62 of the poppet valve 40 is in sealing engagement with the inner sleeve 38 between the port 58 and the port(s) 60, dividing the interior of the inner sleeve 38 into a first chamber 64 and a second chamber 66. The poppet valve 40 has a passageway 68 therethrough which serves as a pilot flow control orifice. The passageway 68 has one end 70 in fluid communication with the port 52 and the other end 72 in fluid communication with the chamber 66. As illustrated, the poppet valve 40 has a projecting snout 74 which extends through the port 56 and into the port 52, the passageway 68 extending through the snout 74.

The biasing means 42 urges the poppet valve 40 into valving engagement with the port 56. It comprises a compression spring 76 seated at one end in a spring seat 78 in the poppet valve 42 and at the other end in a spring seat 80 in the velocity fuse 44.

The velocity fuse 44 comprises a body 82 mounted in the port 58. The body 82 has a port 84 at one end in fluid communication with the chamber 66, a threaded port 86 at the other end in fluid communication with the interior of the outer shell 36, a valve 88 sized and positioned to valve the port 84, and biasing means 90 urging the valve 88 into valving engagement with the port 84. The biasing means 90 comprises a compression spring 92 seated at one end against the valve 88 and at the other end against an adjustment screw 94 which is screwed into the threaded port 86 and which has a through passage 96. An excess flow seat 98 is provided to seat the valve 88 during excess flow.

OPERATION OF THE PRESENTLY PREFERRED EMBODIMENT

Figure 1:
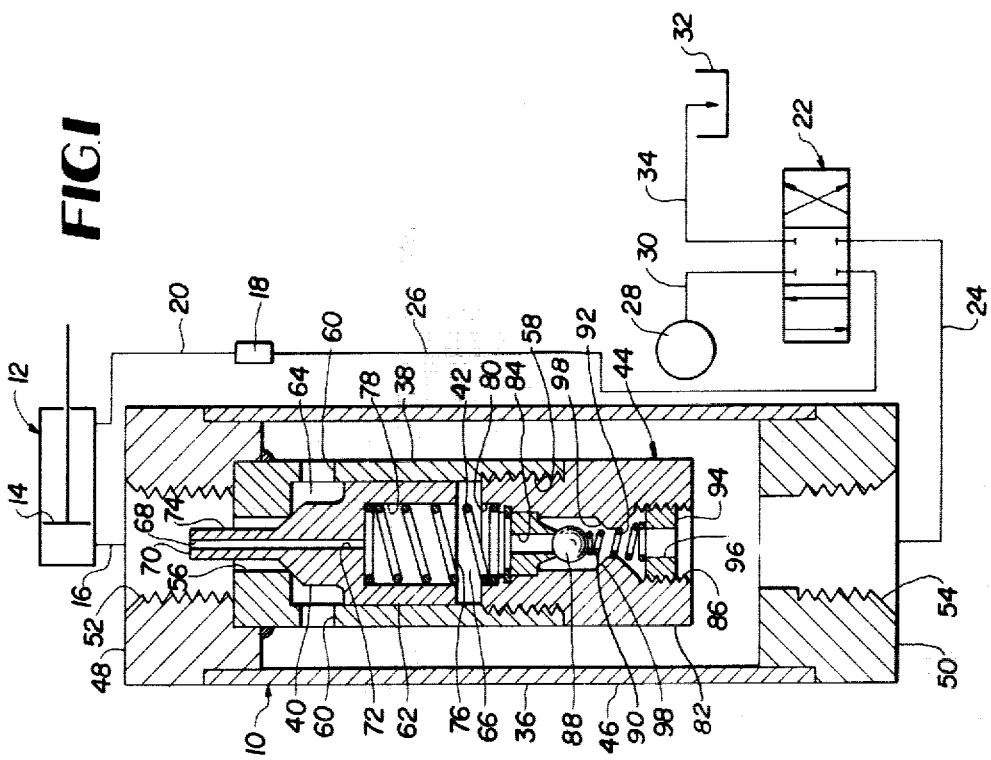
FIG. 1 is an axial cross-sectional view of the presently preferred embodiment of the subject check valve at rest.

In the "at rest" position shown in FIG. 1, the control valve 22 is in its no-flow position, so there is no flow through the hydraulic lines 24 and 16 and the check valve 10. The poppet valve 40 is seated in the port 56 by the biasing means 42, the valve 88 is seated in the port 84 by the biasing means 90, and the pressures in the port 52 the chamber 64, the chamber 66, and the port 54 are equal.

In the flow forward position shown in FIG. 2, the control valve 22 is in position to communicate hydraulic fluid under pressure from the pump 28 through hydraulic lines 30 and 24 to the port 54. Initially, hydraulic fluid does not flow through the check valve 10 because, as illustrated in FIG. 1, the port 84 is closed by the valve 88 and the port 56 is closed by the poppet valve 40. Pressure in the port 54 therefore increases until it is greater than the pressure in the port 52. Since the pressure in the port 54 is communicated to the chamber 64 via the port(s) 60, while the pressure in the port 52 is communicated to the chamber 66 through the passageway 68, the poppet valve 40 moves out of its seat, opening the port 56. As the poppet valve 40 opens, decreasing the size of the chamber 66, the displaced hydraulic fluid from the chamber 66 drains through the passageway 68 into the port 52. The valve 88 remains seated, and the hydraulic fluid passes from the hydraulic line 24, through the port 54 into the interior of the outer shell 36, through the port(s) 60 into the chamber 64, through the port 56 into the port 52, and through the hydraulic line 16 into the push chamber of the hydraulic actuator 12. At the same time, hydraulic fluid from the pull chamber of the hydraulic actuator 12 is forced through the hydraulic line 20, the check valve 18, the hydraulic line 26, the control valve 22, and the hydraulic line 34 to the tank 32.

In the reverse flow position shown in FIG. 3, the control valve 22 is in position to communicate hydraulic fluid under pressure from the pump 28, through the hydraulic lines 30 and 26, the check valve 18, the hydraulic line 20, and into the pull chamber of the hydraulic actuator 12. This forces hydraulic fluid from the push chamber of the hydraulic actuator 12 through the hydraulic line 16, the check valve 10, the hydraulic line 24, the control valve 22, and the hydraulic line 34 to the tank 32. Initially, hydraulic fluid does not flow through the check valve 10 because, as before, the port 84 is closed by the valve 88 and the port 56 is closed by the poppet valve 40. Pressure in the port 52 therefore increases until it is greater than the pressure in the port 54. The increased pressure in the port 52 is communicated to the chamber 66 through the passageway 68, initially holding the poppet valve 40 closed because the area against which the increased pressure acts on the chamber 66 side of the poppet valve 40 exceeds the area against which the increased pressure acts on the port 52 side of the poppet valve 40. However, the increased pressure in the chamber 66 is communicated through the port 84 and soon unseats the valve 88, allowing the pressure in the chamber 66 to drop and the poppet valve 40 to open. The bulk of the hydraulic fluid then passes through the port 52, the port 56, the chamber 64, the port(s) 60, the interior of the outer shell 36, and the port 54 to the hydraulic line 24. The biasing means 90 is sufficiently strong to prevent the valve 88 from seating in the excess flow seat 98, and a small portion of the hydraulic fluid passes through the port 52, the passageway 68, the chamber 66, the port 84, around the open valve 88, and through the passage 96, the port 86, the interior of the outer shell 36, and the port 54.

In the excess flow position shown in FIG. 4, the hydraulic line 24 has been broken while the system was in the flow forward position shown in FIG. 2, causing abrupt loss of work pressure in the push chamber of the actuator 12. The weight of the load (symbolized by the arrow 100) acting against the piston 14 causes rapid reverse acceleration of the hydraulic fluid through the hydraulic line 16, the check valve 10, and the portion of the hydraulic line 24 before the break. The build up in fluid flow is so rapid that the port 56 cannot accomodate it, causing a back pressure build up in the port 52. This pressure is communicated to the chamber 66 via the passageway 68. The pressure in the chamber 66 is in turn communicated through the port 84, where it acts on the upstream face of the valve 88 (which, it will be recalled, is closed when the system is in the flow forward mode). Since the pressure on the downstream face of the valve 88 is the pressure in the port 54, and since that pressure is less than the pressure in the port 52 (which has been communicated to the upstream face of the valve 88), the valve 88 unseats, momentarily allowing flow of hydraulic fluid through the port 84, around the open valve 88, and through the passage 96 and the port 86 to the interior of the outer shell 36, just as when the system is in the reverse flow position of FIG. 3. However, the pressure differential between the pressure in the port 52 and the pressure in the port 54 when the hydraulic line 24 breaks while the system is in the flow forward position (i.e., while the actuator 12 is pushing the load) greatly exceeds the pressure differential between the pressure in the port 52 and the pressure in the port 54 when the system is in the reverse flow position. Accordingly, the valve 88 not only unseats from port 84, it seats itself again in the excess flow seat 98, blocking off the flow of the hydraulic fluid through the velocity fuse 44. Instantly, the pressure in the chamber 66 and the port 52 equalizes. Since the downstream area of the poppet valve 40 on which the pressure in the chamber 66 acts is greater than the upstream area of the poppet valve 40 on which the pressure in the port 52, the port 56, and the chamber 64 acts, the resulting hydraulic forces on the poppet valve 40 cause the poppet valve 40 to seat, stopping flow through the port 56. Since the velocity fuse 44 is also closed by the valve 88, there is no flow through the check valve 10, and the actuator 12 is held in position until the system is repaired.

Although not illustrated, it will be apparent that, if the hydraulic line 26 is broken while the system is in the reverse flow position, the check valve 10 will function in similar fashion and that, if the hydraulic line 24 is broken while the system is in the reverse flow position or the hydraulic line 26 is broken while the system is in the flow forward position and the weight of the load is in the direction illustrated by arrow 101, the check valve 18 will function in similar fashion. Thus, the two check valve 10 and 18 provide protection from breaks in the hydraulic lines 24 and 26 regardless of the flow position of the system at the time of the break.

CAVEAT

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

What is claimed is:
1. A flow sensing check valve comprising:
 (a) an outer shell having a first port at one end thereof and a second port at the other end thereof;
 (b) an inner sleeve mounted in said outer shell, said inner sleeve having a first port at one end thereof in fluid communication with the first port in said outer shell, a second port at the other end thereof in fluid communication with the second port in said outer shell, and a third port intermediate the other two ports in said inner sleeve, the third port in said inner sleeve being in fluid communication with the second port in said outer shell;

(c) a poppet valve slidably disposed in said inner sleeve, the outer periphery of said poppet valve being in sealing engagement with the inside of said inner sleeve between the second and third ports in said inner sleeve and having a passageway therethrough serving as a pilot flow control orifice, said passageway having a first end in fluid communication with the first port in said outer shell and a second end in fluid communication with the interior of said inner sleeve between said poppet valve and the second port in said inner sleeve;

(d) first means urging said poppet valve into valving engagement with the first port in said inner sleeve; and (e) a velocity fuse cooperating with the second port in said inner sleeve to close the second port in said inner sleeve upon sensing a pre-selected pressure in the first port in said outer shell.

2. A flow sensing check valve as recited in claim 1 wherein said poppet valve comprises a projecting snout which extends through the first port in said inner sleeve and into the first port in said outer shell, the passageway in said poppet valve extending through said snout.

3. A flow sensing check valve as recited in claim 1 wherein said velocity fuse has a first port at one end thereof in fluid communication with the interior of said inner sleeve, a second port at the other end thereof in fluid communication with the interior of said outer shell, a valve sized and positioned to valve either port in said velocity fuse, and second means urging said valve into valving engagement with the first port in said velocity fuse, said second means being sized to permit said valve to valve the second port in said velocity fuse when said velocity fuse senses a pre-selected pressure in the first port in said outer shell.

4. A flow sensing check valve as recited in claim 1 wherein the third port in said inner sleeve is axially located intermediate the other two ports in said inner sleeve near the first port in said inner sleeve.

5. A flow sensing check valve comprising:
(a) an outer shell having an internal cavity and first and second ports, both of which provide paths of fluid communication between the exterior of said outer shell and said internal cavity;
(b) a first valve disposed in said internal cavity between said first port and a pressure chamber, said first valve being urged by first biasing means into valving engagement with said first port;
(c) a first passageway which is in fluid communication at one end with said first port and at the other end with said pressure chamber;
(d) a second passageway which is in fluid communication at one end with said pressure chamber and at the other end with said second port; and
(e) a second valve disposed in said second passageway, said second valve being urged by second biasing means into valving engagement with a first valve seat in said second passageway, said second valve being designed to unseat from said first valve seat in response to a first predetermined pressure differential between said pressure chamber and said second port and to seat in a second valve seat in said second passageway in response to a second, higher predetermined pressure differential between said pressure chamber and said second port, thereby increasing the pressure in said pressure chamber and closing said first valve.

6. A flow sensing check valve as recited in claim 5 wherein said first port is sized to create an increase in pressure in said pressure chamber in response to a sudden increase in flow through said first port.

7. A flow sensing check valve as recited in claim 5 wherein said first passageway passes through said first valve.

8. A flow sensing check valve as recited in claim 5 or claim 7 wherein:
(a) an inner shell is mounted in said internal cavity, said inner shell having an internal bore and first, second, and third ports, all of which provide paths of fluid communication between the exterior of said inner shell and said internal bore;
(b) said first port in said inner shell is in fluid communication with said first port in said outer shell;
(c) said second and third ports in said inner shell are in fluid communication with said second port in said outer shell;
(d) said first valve and said pressure chamber are disposed in said internal bore;
(e) said second passageway leads from said pressure chamber to said second port in said inner shell; and
(f) said first port in said inner shell is in fluid communication with said third port when said first valve is unseated.

* * * * *